United States Patent [19]

Wieder

[11] Patent Number: 4,765,585
[45] Date of Patent: Aug. 23, 1988

[54] SLIDE RETAINER FOR INJECTION MOLDS

[75] Inventor: Klaus A. Wieder, Helenville, Wis.

[73] Assignee: Superior Die Set Corporation, Oak Creek, Wis.

[21] Appl. No.: 19,569

[22] Filed: Feb. 27, 1987

[51] Int. Cl.$^4$ .............................................. B29C 45/42
[52] U.S. Cl. ........................................ 249/64; 249/68; 292/170; 425/192 R; 425/444; 425/556
[58] Field of Search .............................. 249/64, 67, 68; 425/192 R, 556, 577, 589, 595, 451.7, 451.9, 444, DIG. 221; 264/334; 292/163, 170, 333

[56] References Cited

U.S. PATENT DOCUMENTS

| | | | |
|---|---|---|---|
| 965,279 | 7/1910 | Burge | 292/170 X |
| 980,630 | 1/1911 | Granger | 292/170 |
| 2,436,065 | 2/1948 | Dewey, Jr. | 249/64 X |
| 3,509,603 | 5/1970 | Halsall et al. | 249/64 X |
| 3,811,645 | 5/1974 | Feist | 249/68 |
| 4,050,666 | 9/1977 | Van Tichelt | 249/68 |
| 4,082,245 | 4/1978 | Santos | 249/68 |
| 4,118,168 | 10/1978 | Rees et al. | 249/68 X |
| 4,174,939 | 11/1979 | Fenner | 425/451.9 |
| 4,179,254 | 12/1979 | Brown | 249/68 X |
| 4,299,371 | 11/1981 | Duga | 425/556 X |
| 4,403,810 | 9/1983 | Bieneck | 425/589 |
| 4,556,377 | 12/1985 | Brown | 249/68 X |
| 4,576,568 | 3/1986 | Grannen, III | 249/64 X |

Primary Examiner—Richard L. Chiesa
Attorney, Agent, or Firm—Michael, Best & Friedrich

[57] ABSTRACT

A conventional injection mold of the type having two half parts, and slides connected to core parts which slide inwardly and outwardly as the mold half parts open and close, have mounted therein slide retainers which lock the slides in position with respect to a slide plate in one of the mold half parts when the mold halves are fully opened. The retainers include a latch portion mounted to the slide and having a camming surface facing away from the core of the mold and a V-shaped notch therein, and a slide lock mounted below the surface of the slide plate and having a plunger with a head which extends upwardly above the flat surface of the slide plate. The head of the plunger is formed in a V-shape to match the V-shaped notch of the latch and is spring biased upwardly to provide a firm engagement between the plunger head and the latch when the slide is in the fully opened position. A stack of bowed, spring loaded washers may be utilized to apply the spring bias against the plunger to drive it upwardly. By mounting the slide lock below the surface of the slide plate and the latch within the slide, very little machining of standard mold parts is required and minimal space within the mold is occupied by these parts, so that the normal operation of the mold is not obstructed and no substantial modification of the mold is required.

6 Claims, 3 Drawing Sheets

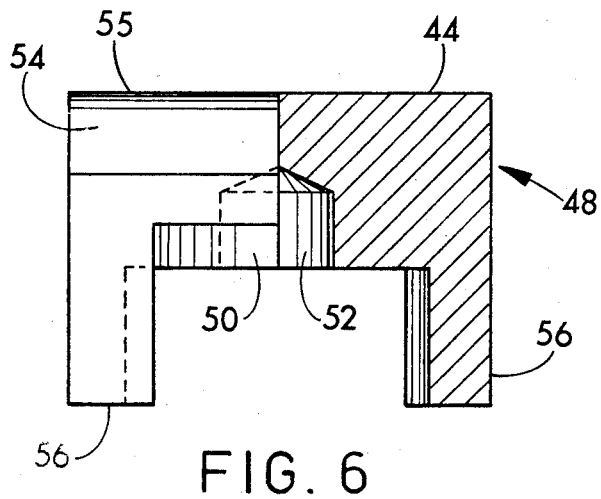
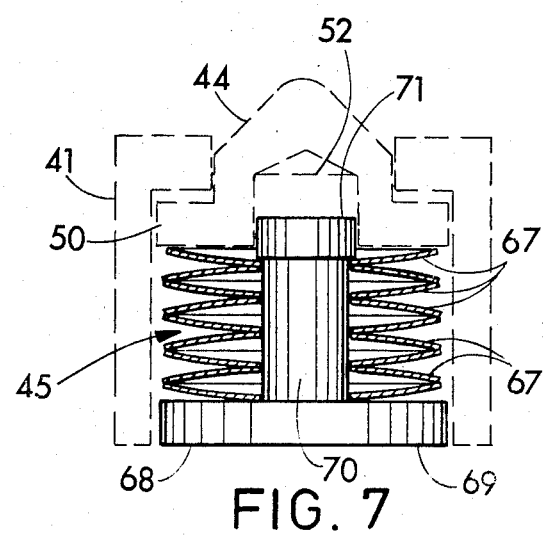
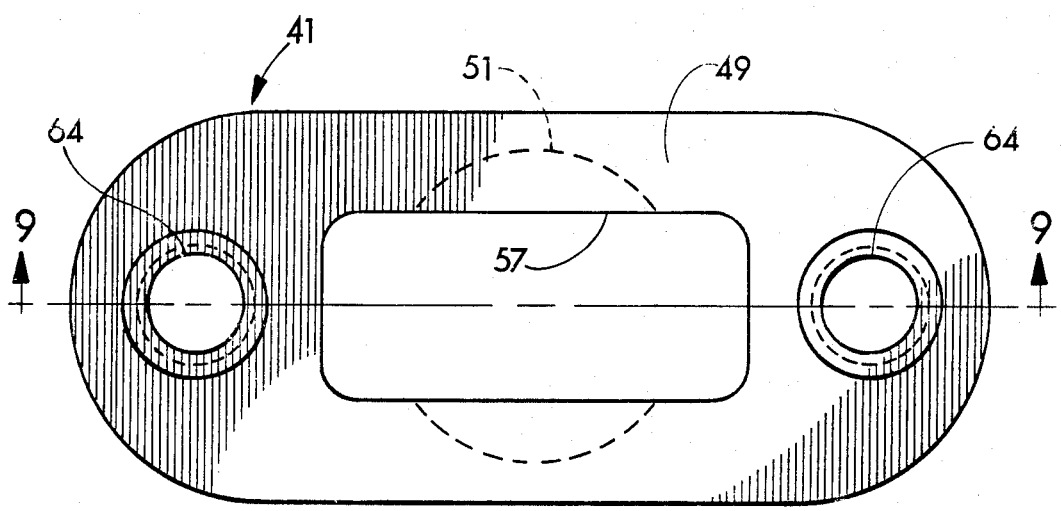
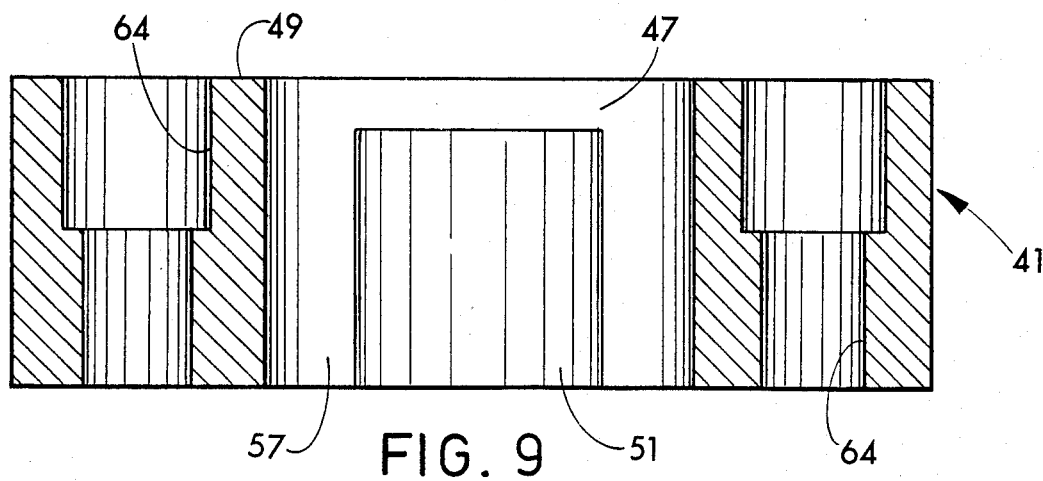

SLIDE RETAINER FOR INJECTION MOLDS

BACKGROUND OF THE INVENTION

In injection molding machines, the mold is opened and closed at a parting line; mating parts separate at the parting line and move away from each other in a direction parallel to the clamping force, with the force usually being provided by a hydraulic cylinder. Core parts of the mold are also typically opened and closed laterally by slides that open and close simultaneously with the mating parts. As the mating parts move, they engage with inclined cams or pins and actuate the moving of the slides.

When the mold is completely open and the cam pins are withdrawn from inclined bores in the slides, it becomes necessary to hold the slides aligned in their open position while removing the molded article and awaiting the next molding cycle. The slides are held in position to allow for reentry of the cam pin when the mold is to be reclosed. Although the slides must be firmly and accurately held in the open position, the slides must also release readily when the cam pins reengage the inclined bores in the slides, thereby moving the core parts laterally together until the mold is again closed.

The prior art discloses various ways of holding the slides in position when the mold is open. One mold construction employs a pull rod that projects laterally from each slide. The slide is urged outwardly by a preloaded compression spring or hydraulic cylinder that is, along with the pull rod, housed on the exterior of the mating parts. The slide abuts a stop plate when the mold is completely open. A number of disadvantages have been noted for this approach. First, the assembly that protrudes from the mating parts must be removed to provide clearance to insert or remove the mold. Second, the necessary pre-loading is an additional assembly operation and may be a cause of injury to the operator. In addition, the pressure of the spring is applied during the entire movement of the cams, and may result in galling of the surfaces of the cam pins or the bores in the slides.

Another prior retaining system employs a dowel pin inserted into the slide. When the slide travels to the open position, the dowel pin enters into a jaw-like opening of a stationary slide retainer. The jaw-like opening is shaped like a socket and exerts the gripping forces required to keep the slide in the open position. A small spring is placed crosswise in the end of the body of the slide retainer opposite the jaw-type opening to apply spring pressure to the jaws. Although this retainer system is positive locking, the repeated engagement and disengagement of the spring loaded retainer and dowel pin may result in galling of the surfaces of these parts with consequent loss of positioning accuracy when the slide is locked in the open position. Dimensioning of the parts is particularly critical. The extending dowel pin is subjected to large loads and may be susceptible to shearing or bending after many molding cycles. The dowel pin and locking retainer also require a substantial amount of clearance space in the mold parts to accommodate these structures.

SUMMARY OF THE INVENTION

In accordance with the present invention, a mold of the type used in injection molding sheaths is provided with a positive locking mechanism for retaining the slides and core parts in a precisely located position when the mold half parts are drawn away from each other to open the mold. The conventional mold parts include stationary and movable pressure plates to which the mold halves are mounted, molding elements which define the internal cavity into which the liquid plastic will be injected, and core pieces which are movable laterally away from each other as the mold half parts are drawn apart. The core pieces are mounted to slides which slide laterally on slide plates, and the slides themselves are driven inwardly and outwardly by obliquely mounted cam pins which engage with inclined bores within the slides to cause the slides to move inwardly and outwardly as the mold half parts are drawn together or drawn apart, respectively. At the outwardmost positions of the slides, where the cam pins are fully withdrawn from the inclined bores in the slides, the slides are locked in place in their open position by slide retainers mounted between the slides and the slide plates. The retainers serve to lock the slides in a precise open position until the mold begins to close again and the cam pins engage with the inclined bores in the slides. The precise location of the slides which is provided by the retainers ensures that the cam pins will precisely mate with the inclined bores in the slides.

Each of the slide retainers includes a latch portion and a slide lock portion, the respective portions mounted to one or the other of the slide and slide plate. The slide lock includes a plunger, mounted for up and down motion within a holder, and spring biased to normally protrude slightly above the flat face surface of the holder. The holder is mounted within a depression in, for example, the slide plate so that the face surface of the holder is coplanar with the surface of the slide plate. The latch is mounted into the lower surface of the slide which slides upon the surface of the slide plate, and the slide has a recess or alcove therein which is formed to allow the slide to pass over the plunger without interference until engagement of the plunger by a leading camming surface on the latch. The camming surface drives the plunger downwardly against the spring bias until a latch recess notch is over the plunger, at which point the plunger moves back upwardly, engaging the mating recess notch of the latch and thereby securing the slide in position. Because the slide lock and the latch are both mounted in recesses in the slide plate and slide, respectively, they do not interfere with the free range of motion of these parts relative to one another, and require very little modification of existing slides and slide plate structures to accommodate the retainers. The plunger is preferably formed with a head having two elongated sides inclining to a peak in a general inverted V-shape, so that the head of the plunger engages the leading camming surface on the latch during opening of the mold to drive the plunger downwardly with a sliding action of these engaging surfaces. Similarly, once the head of the plunger is engaged in the notch recess in the latch, the plunger can disengage from the latch by the sliding camming action of the opposite face of the head of the plunger against a surface of the V-shaped notch within the latch. This engagement structure allows a very low profile protrusion of the plunger head beyond the surface of the slide plate to be utilized, while yet achieving very stiff locking engagement between the slide lock and the latch so that the slide is firmly held in a precisely aligned orientation.

To obtain the high locking engagement forces between the plunger head and the latch, it is desirable to provide a high spring bias force against the plunger. Nonetheless, it is preferred that a minimum amount of space be required to accommodate the spring, therefore requiring a minimum amount of machined indentation in the slide plate. A desirable spring structure is provided by plural bowed spring washers forming a stack beneath the plunger which provide both the high spring force required and an adequate travel of the plunger within the slide lock holder.

Further objects, features, and advantages of the invention will be apparent from the following detailed description when taken in conjunction with the accompanying drawings.

BRIEF DESCRIPTION OF THE DRAWINGS

In the drawings:

FIG. 6 is a view, partially in section, of the plunger portion of the slide lock.

FIG. 7 is a view, partially in section, showing the preferred biasing spring for the plunger, with the surrounding portions of the slide lock holder and plunger shown in dashed lines for purposes of illustration.

FIG. 8 is a top plan view of the holder portion of the slide lock.

FIG. 9 is a cross-sectional view through the holder portion taken generally along the lines 9—9 of FIG. 8.

DESCRIPTION OF THE PREFERRED EMBODIMENT

Figure 1:
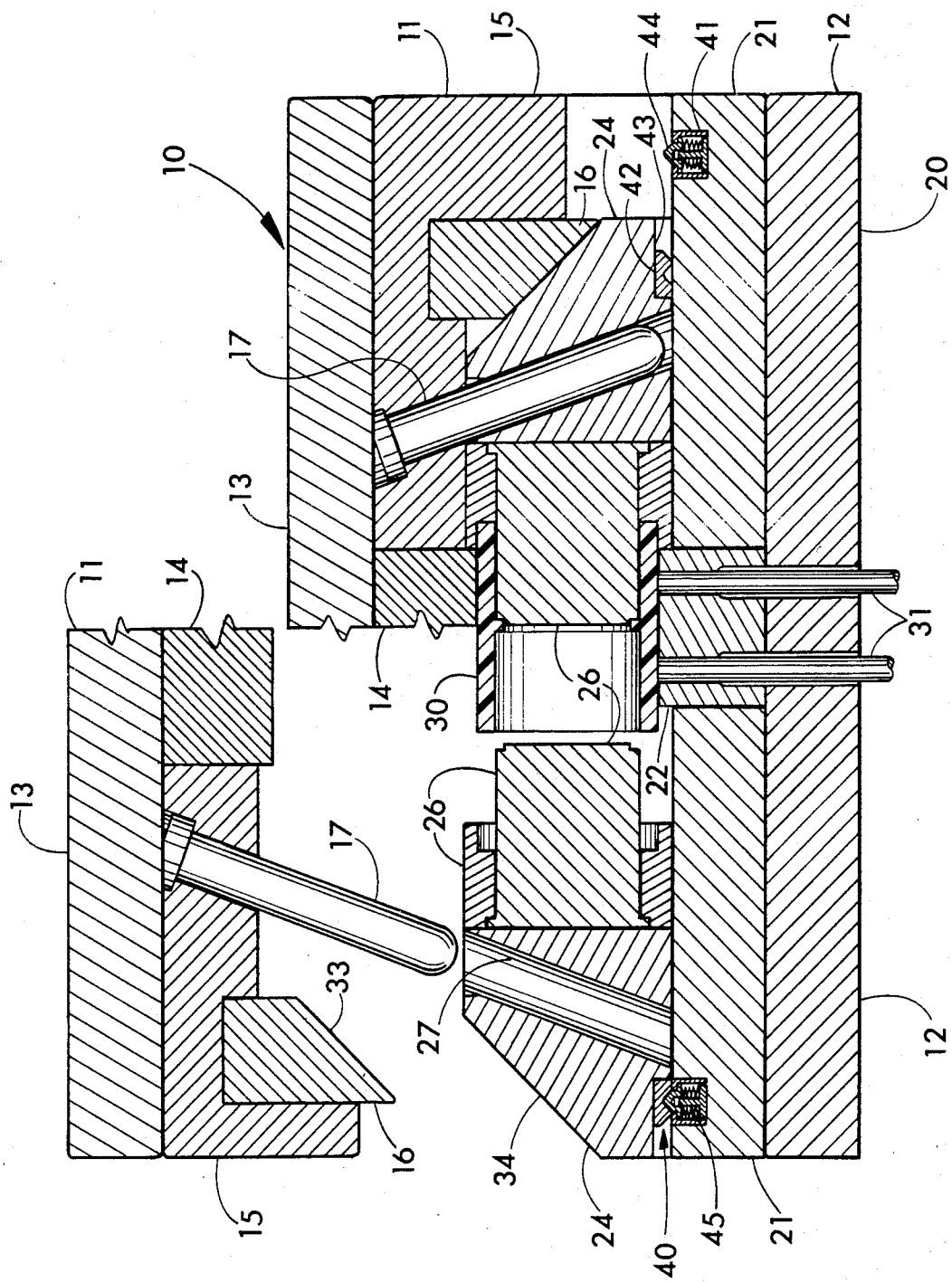
FIG. 1 is a partial cross-sectional view, somewhat simplified, of a conventional injection mold having two half portions, the parts of the mold being split for purposes of illustration by showing one section of the mold with the mold parts closed and the other section of the mold with the mold parts in the open position.

With reference to the drawings, an illustrative plastic injection mold is shown generally at 10 in FIG. 1 in cross-section with the left hand portion of the mold 10 being shown in the open position in FIG. 1 and the right hand portion being shown in the closed position. The parts of the mold shown in FIG. 1 are generally conventional, and are shown in FIG. 1 in somewhat simplified form and without certain conventional parts being illustrated, the required arrangement of parts for practical plastic injection molding equipment being well understood by those skilled in the art. For purposes of illustrating the present invention, the mold 10 includes an upper mold half part 11 and a lower mold half part 12. The upper mold half part 11 includes a pressure plate 13, mold cavity defining elements 14, a mold frame structure 15, and a pressure pad with inclined surface 16. A cam pin 17 extends outwardly from the structure 15 at an oblique angle with respect to the direction of motion of the two mold parts 11 and 12 as they move toward and away from each other. The lower mold half 12 includes a pressure plate 20, slide plates 21, mold cavity defining parts 22 and slides 24 which are mounted to the slide plates 21 to slide back and forth thereon in a lateral direction perpendicular to the direction of relative motion between the two mold half parts 11 and 12. Mold core pieces 26 are mounted to the slides 24 to move back and forth with them. An inclined bore 27 is formed in each slide 24 and these bores are positioned to receive the cam pins 17 when the mold portions are drawn together.

It is seen from the left hand portion of the view of the mold in FIG. 1 that as the cam pin 17 begins to engage the walls of the inclined bore 27, the slide 24 will tend to be drawn by the pin 17 inwardly toward the mold core pieces 26 on the other right half portion of the mold. For illustration, a molded part 30 is shown within the mold in FIG. 1, and knock-out rods 31 are shown in their customary position with respect to the mold cavity which will contain the molded part 30, it being understood that the knock-out rods 31 would be activated when the mold portions 11 and 12 are withdrawn from one another to force the molded part 30 out from the mold cavity. For simplicity of illustration, the injection nozzle and sprue are not shown in FIG. 1, although it is understood that they would be formed in the mold in a conventional fashion as desired. It is also seen that the inclined inner surface 33 of the pressure pads 16 will engage a similarly inclined outer surface 34 on the slides 24 to urge the slides into their final tightly closed position when the two mold half portions are closed. All of the foregoing described parts are conventional and may be formed in the wide variety of variations known in injection molding technology.

Proper operation of the mold requires that the slides 24 with attached core pieces 26 move smoothly from the closed position shown on the right hand side of FIG. 1, in which the molding cavity is sealed off, to the open position shown on the left hand side of FIG. 1. The slide 24 must be capable of moving freely and with relatively little force as the pin 17 should not have to exert undue force on the walls of the inclined bores 27 to move the slide in and out. However, when the slides 24 are in their outermost position, as illustrated on the left hand side of FIG. 1, the molded parts 30 must be ejected or removed from the mold without interference from the core pieces 26 and, during this time, the pins 17 will be entirely free of the inclined bore 24 so that the slides 24 are not restrained by the cam pins. If, in the process of knocking the mold parts 30 out of the mold, the slide 24 was moved inwardly or outwardly, the opening to the bores 27 would not precisely align underneath the pins 17, with the consequence that when the mold half portions 11 and 12 were drawn back together, the tip of the cam pins 17 might engage the top of the slides 24, causing the mold to hang up, or the pins might engage an edge of the outer opening of the bores 27 with resulting damage to either the bore or the pin or both.

To hold the slides 24 in the desired outermost position so that the pins 17 can fit precisely into the opening of the bores 27 in the slides, slide retainer mechanisms 40 in accordance with the present invention are mounted between the slides 24 and the slide plates 21 to releasably engage these two sets of parts with respect to one another to prevent relative motion. Each slide retainer includes a slide lock portion 41 and a latch portion 42, mounted respectively to one of either the slide plate 21 or the slide 24. For purposes of illustration, the slide lock 41 is shown mounted within an indentation in the slide plate 21 and the latch 42 is shown mounted within a recess or alcove 43 at the outer end of the slide 24. It is understood that the relative position of these two portions of the slide retainer could be reversed, with the slide lock 41 mounted to the slide 24 and the latch 42 mounted within a recess or channel within the slide plate 21. As illustrated in FIG. 1, the generally inverted V-shaped plunger head 44 of the slide lock extends upwardly beyond the flat surface of the slide plate 21, whereas the latch 42 is recessed entirely below the surface of the slide 24 which slides upon the surface of the slide plate 21. Again, it would be possible for the latch 42 to extend below the surface of the slide 24 by having the slide lock 41 reside in a depression or recess channel below the surface of the slide plate 21 so that the motion back and forth of the latch 24 would be unimpeded until it engaged the plunger head 44. However, to minimize the volume of the respective parts, such as the slide plate, which must be machined out to accommodate the slide lock 41, it is preferred that the slide lock be mounted so that its plunger head 44 extends above the surface and with the corresponding latch 42 being recessed below the mating surface of the slide.

Figure 2:
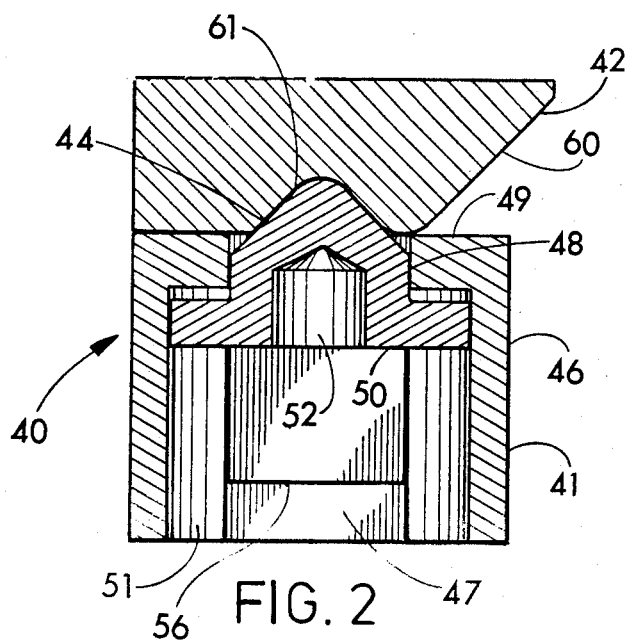
FIG. 2 is an enlarged cross-sectional view showing the larch and slide lock in greater detail with the biasing spring removed for clarity of illustration.

A cross-section through a slide retainer mechanism 40 of the present invention is shown in greater detail in FIG. 2 with the biasing spring 45 removed for illustrative purposes. The slide lock 41 includes a holder 46 having an internal cavity 47 within which the plunger 48 may move upwardly and downwardly. The head 44 of the plunger 48 normally is biased by the spring to extend slightly above the top face surface 49 of the holder 46. The plunger 48 has a cylindrical flange 50 with outer surfaces that mate with a cylindrical wall 51 of the cavity 47 of the holder 46. A central cavity 52 is formed in the plunger 48 to facilitate mounting of a biasing spring beneath the plunger, as explained further below.

Figure 4:
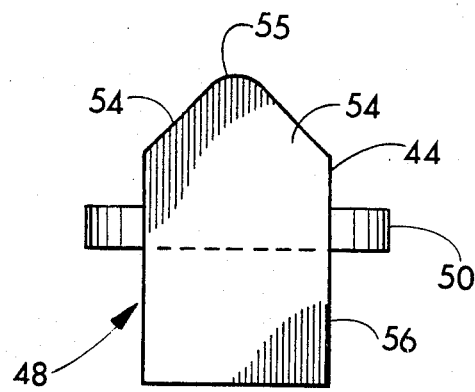
FIG. 4 is a side elevation view of the plunger portion of the slide lock.
Figure 3:
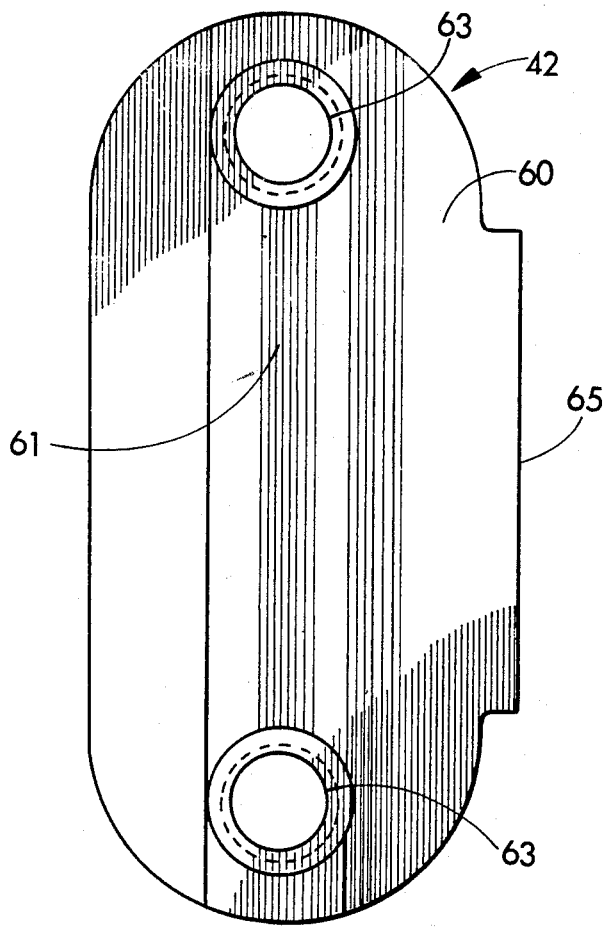
FIG. 3 is a top plan view of the latch insert.
Figure 5:
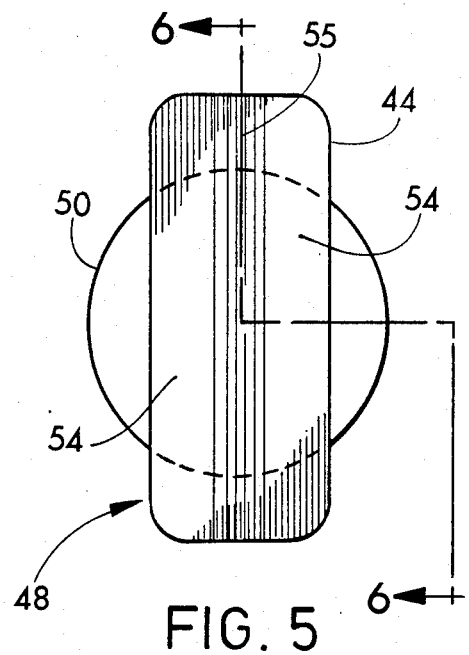
FIG. 5 is a top plan view of the plunger portion of the slide lock.

As best illustrated in FIGS. 4, 5 and 6, the plunger head 44 is formed with two upwardly sloping camming surfaces 54 which intersect at a rounded top 55 to form a general inverted V-shape. As illustrated best in FIG. 5, the camming surfaces 54 extend lengthwise to form a generally elongated head 44 relative to the width of the head 44. The plunger 48 also has downwardly extending wing panels 56, best seen in FIG. 6, which slide upwardly and downwardly in a mating opening 57 of the cavity 47 within the holder 41.

The camming surfaces 54 of the plunger head will engage, as the mold half portions open, a leading camming surface 60 on the latch 42. As the face 54 of the plunger head engages the camming surface 60, the plunger will be driven downwardly into the cavity within the holder 41 against the spring bias pressure. When the position of the latch relative to the plunger is as shown in FIG. 2, the plunger moves back upwardly until its head engages into a notch recess 61 formed in the latch 42 bottom surface. The surfaces of the notch 61 generally conform to the inverse of the camming surfaces 54 and top edge 55 of the plunger so that the plunger head will fit snugly into the notch 61 during engagement of the two parts, with the plunger preferably being slightly depressed from its upwardmost position as illustrated in FIG. 2. The latch 42 may be secured to the slide by screws (not shown) threaded through screw holes 63 in the latch. Similarly, the holder 41 may be secured to the slide plate by screws (not shown) threaded through screw holes 64 in the holder into threaded holes in the slide plate beneath the holder.

The latch 42 has an outwardly extending orientation key 65 which ensures that the latch will be installed in the correct position since the key 65 must extend into the recess 43 area to allow installation of the latch.

It is particularly important that the plunger be urged upwardly under a relatively strong spring force which is nonetheless provided by a spring contained within a relatively limited containment space within the holder 41. While conventional coil springs can be utilized, the wire coils require a significant amount of space if a high spring force is to be exerted by the coils since, generally, the greater the spring force, the greater the required thickness of the wires within the spring coils. Consequently, relatively little travel would be available for the compression of the coil spring under the plunger. As an alternative to the conventional coil spring, it has been found that a stack of bowed, spring tension washers 67 provide excellent spring force and travel. When the spring tension washers 67 are placed in opposing relation as shown in FIG. 7, so that the washers are in contact with adjacent washers at the inner and outer peripheral edges thereof, a highly efficient spring system having a significant range of compression movement relative to the compressive force required is possible. The washers 67 are held on a pedestal 68 formed of a circular base 69 which fits within the cylindrical cavity 51 of the holder and a center post 70 which extends up through the central openings of the washers 67 and into the central cavity 52 of the plunger and has an expanded cap flange 71 to hold the spring washers 67 in place.

The materials forming the retainer 40 may be various common materials used in injection molds, preferably a hardened steel material which will withstand well the repeated engagements and disengagements of the latch portion 42 with the plunger 44 of the slide lock 41. It is highly desirable that the various parts of the retainer, and particularly the plunger 44 which moves upwardly and downwardly within the holder 46, be precisely machined so that these parts move smoothly with respect to one another with minimal misalignment. One machining technique which has been found particularly effective in manufacturing the parts to the required tolerances is wire electrical discharge machining (EDM) which can be used to cut the opening 57 within the holder 46. The plunger 48 may similarly be effectively cut out from a sheet or plate of steel material by the EDM process. It will be noted that the fitting of the cylindrical outer surfaces of the flange 50 on the plunger 48 within the cylindrical cavity 51 of the holder 46 allows the plunger to move upwardly and downwardly within the holder in relatively smooth movement, while the engagement of the extending portions 56 with the sides of the cavity 57 within the holder ensures that the plunger will not rotate or be deflected as it is engaged with the surfaces of the latch 42.

It is understood that the invention is not confined to the particular construction and arrangement of parts herein illustrated and described, but embraces such modified forms thereof as come within the scope of the following claims.

What is claimed is:

1. A slide retainer for a mold of the type having mold halves which are drawn away from each other and having a slide movable laterally inwardly and outwardly along the surface of a slide plate to move a core part of the mold inwardly and outwardly, the slide retainer comprising:

(a) a latch having an inclined camming surface and a V-shaped notch adjacent the camming surface; and (b) a slide lock having a holder portion with a flat face surface and a cylindrical cavity therein with a generally rectangular top opening in the flat face surface, a plunger mounted within the cylindrical cavity, the plunger having a cylindrical walled flange which is formed to be housed in the cylindrical cavity of the holder such that the plunger rides upwardly and downwardly in the holder, and a plunger head having inclined camming surfaces meeting at a rounded top edge in a generally inverted V-shape complementary to the shape of the notch in the latch, and a means for spring biasing the plunger upwardly within the holder such that the head of the plunger extends upwardly beyond the flat face surface of the holder.

2. The slide retainer of claim 1 wherein the means for spring biasing the plunger upwardly within the holder comprises a pedestal having a central rod and a plurality of bowed, spring tension washers mounted in facing relation about the rod to form a spring engaging the plunger.

3. An improved mold of the type having mold half portions which are drawn toward and away from each other during the molding process, at least one of the mold half portions having a slide plate, and a slide with a core part attached thereto which slides laterally inwardly and outwardly as the mold half portions are drawn together or pulled apart, the slide having a surface which slides on the slide plate, the improvement comprising:

a latch having a notch surface formed therein, the latch being mounted in one of the slide or slide plate and having a leading camming surface facing outwardly with respect to the core part and a slide lock mounted to the other of the slide and slide plate, the slide lock including a body portion having a top face surface and a plunger housed in the body with an extending head of the plunger having an inverted V-shaped camming surface extending up to a top edge, and the slide lock including spring means for biasing the plunger upwardly such that the head of the plunger extends normally above the top face surface of the slide lock, the latch and slide lock being mounted to the respective slide and slide plate such that the leading camming surface of the latch will come into contact with the camming surface of the head of the plunger as the mold half portions are drawn away from each other and the slide moves outwardly, and wherein the engagement of the leading camming surface of the latch and the camming surface of the plunger will drive the plunger downwardly against the spring means to depress the plunger head until the notch in the latch is directly above the plunger, wherein the plunger head will move into the notch of the latch to thereby lock the slide in position with respect to the slide plate and prevent further movement therebetween until the mold parts are closed together again.

4. The improved mold of claim 3 wherein the slide lock includes a holder having an internal cylindrical cavity extending upwardly and downwardly within the holder, the plunger having a mating cylindrical flange which fits within the cylindrical cavity within the holder to slide upwardly and downwardly therein, and wherein the head of the plunger is formed of two elongated camming surfaces, of substantially greater length than width, which meet together at a rounded top edge.

5. The improved mold of claim 4 wherein the latch has an elongated V-shaped notch therein which is shaped and sized to match the inverted V-shaped head of the plunger.

6. The improved mold of claim 3 wherein the slide lock portion has a holder having a cavity therein within which the plunger slides upwardly and downwardly, and wherein the means for spring biasing the plunger upwardly includes a pedestal having a central post and a plurality of bowed, spring tension washers arranged in a stack with the washers arranged in facing relation to one another.

* * * * *